(12) United States Patent
Usui

(10) Patent No.: US 9,450,964 B2
(45) Date of Patent: Sep. 20, 2016

(54) INFORMATION PROCESSING SYSTEM, INFORMATION PROCESSING METHOD, AND COMPUTER PROGRAM PRODUCT

(71) Applicant: Shuuichi Usui, Saitama (JP)

(72) Inventor: Shuuichi Usui, Saitama (JP)

(73) Assignee: RICOH COMPANY, LTD., Tokyo (JP)

( * ) Notice: Subject to any disclaimer, the term of this patent is extended or adjusted under 35 U.S.C. 154(b) by 77 days.

(21) Appl. No.: 14/167,015

(22) Filed: Jan. 29, 2014

(65) Prior Publication Data

US 2014/0223539 A1    Aug. 7, 2014

(30) Foreign Application Priority Data

Feb. 6, 2013   (JP) ................. 2013-021830
Nov. 27, 2013  (JP) ................. 2013-245403

(51) Int. Cl.
*H04L 29/06* (2006.01)
*G06F 9/00* (2006.01)
*H04L 29/08* (2006.01)
*H04L 29/12* (2006.01)

(52) U.S. Cl.
CPC ............... *H04L 63/104* (2013.01); *G06F 9/00* (2013.01); *H04L 61/1541* (2013.01); *H04L 67/00* (2013.01)

(58) Field of Classification Search
CPC ............ H04L 63/104; H04L 61/1541
USPC ............................... 726/6, 12, 28
See application file for complete search history.

(56) References Cited

U.S. PATENT DOCUMENTS

| | | | | |
|---|---|---|---|---|
| 7,464,048 B2* | 12/2008 | Ishii et al. | ................... | 705/14.1 |
| 2001/0044786 A1* | 11/2001 | Ishibashi | ................ | G06Q 20/04 705/77 |
| 2001/0044900 A1* | 11/2001 | Uchida | ................... | G06F 21/32 713/186 |
| 2002/0052796 A1* | 5/2002 | Tadokoro | ................ | G06F 21/41 705/26.42 |
| 2007/0036167 A1* | 2/2007 | Hu | ................................. | 370/410 |
| 2007/0289005 A1* | 12/2007 | Kumar et al. | .................. | 726/10 |
| 2008/0048022 A1* | 2/2008 | Vawter | ................... | G06Q 20/32 235/380 |

(Continued)

FOREIGN PATENT DOCUMENTS

| | | |
|---|---|---|
| JP | 4630470 | 11/2010 |
| JP | 2011-227667 | 11/2011 |

OTHER PUBLICATIONS

Cao, "Cognitive Adaptive Access-Control System for a Secure Locator/Identifier Seperation Context", 2014, IEEE, p. 361-369.*

*Primary Examiner* — David Pearson
*Assistant Examiner* — Gregory Lane
(74) *Attorney, Agent, or Firm* — Oblon, McClelland, Maier & Neustadt, L.L.P.

(57) ABSTRACT

An information processing system includes a receiving unit and a determining unit. The receiving unit receives an application request to request an application for a service. The application request includes first information identifying a type of the service. When the receiving unit receives the application request, the determining unit determines third information indicating an authority to use the service by combining the first information included in the application request and second information used for identifying a user to whom the service is to be provided.

9 Claims, 5 Drawing Sheets

(56) References Cited

U.S. PATENT DOCUMENTS

| | | | |
|---|---|---|---|
| 2008/0126646 A1* | 5/2008 | Sakanaka | H04L 67/025 710/119 |
| 2009/0151006 A1* | 6/2009 | Saeki et al. | 726/28 |
| 2010/0070559 A1* | 3/2010 | Miura et al. | 709/202 |
| 2010/0186069 A1* | 7/2010 | Liu | 726/4 |
| 2012/0254935 A1* | 10/2012 | Yato | H04L 9/321 726/1 |
| 2013/0019291 A1* | 1/2013 | Zou | 726/6 |
| 2013/0103802 A1* | 4/2013 | Kawato | H04L 65/40 709/217 |
| 2013/0269007 A1* | 10/2013 | Yoshigaki | H04L 9/3226 726/5 |

* cited by examiner

FIG.3

230
- 231 RECEIVING UNIT
- 232 DETERMINING UNIT
- 233 STORAGE UNIT
- 234 NOTIFYING UNIT
- 235 AUTHENTICATING UNIT

FIG.4

| FIRST INFORMATION | SECOND INFORMATION |
|---|---|
| SPECIAL-DEVICE TV CONFERENCE | 0001-C2 |
| SPECIAL-DEVICE TV CONFERENCE | 0001-C2 |
| MOBILE TV CONFERENCE | 0001-C3 |
| CC CLOUD | A0001 |
| EQUIPMENT RENTAL | 0001-C2 |
| SPECIAL-DEVICE TV CONFERENCE | 0002-E1 |

The first row is indicated as THIRD INFORMATION.

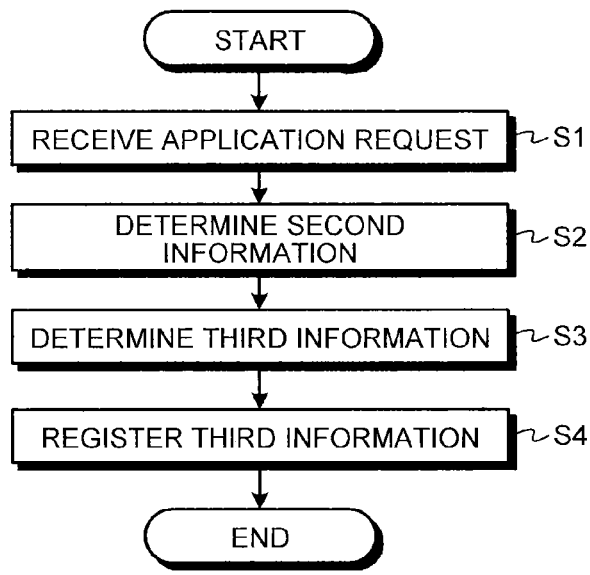

FIG.7

| FIRST INFORMATION | SECOND INFORMATION | SIXTH INFORMATION | |
|---|---|---|---|
| SPECIAL-DEVICE TV CONFERENCE | 0001-C2 | 01 | ⎫ THIRD INFORMATION |
| SPECIAL-DEVICE TV CONFERENCE | 0001-C2 | 02 | |
| MOBILE TV CONFERENCE | 0001-C3 | 01 | |
| CC CLOUD | A0001 | – | |
| EQUIPMENT RENTAL | 0001-C2 | – | ← THIRD INFORMATION |
| SPECIAL-DEVICE TV CONFERENCE | 0002-E1 | 02 | |

FIG.8

| FIFTH INFORMATION | FIRST INFORMATION | SECOND INFORMATION | SIXTH INFORMATION | |
|---|---|---|---|---|
| AA INDUSTRY | SPECIAL-DEVICE TV CONFERENCE | 0001-C2 | 01 | ⎫ THIRD INFORMATION |
| AA INDUSTRY | SPECIAL-DEVICE TV CONFERENCE | 0001-C2 | 02 | |
| AA INDUSTRY | MOBILE TV CONFERENCE | 0001-C3 | 01 | |
| AA INDUSTRY | CC CLOUD | A0001 | – | |
| AA INDUSTRY | EQUIPMENT RENTAL | 0001-C2 | – | ← THIRD INFORMATION |
| BB INDUSTRY | SPECIAL-DEVICE TV CONFERENCE | 0002-E1 | 02 | |

FIG.9

| GROUP ID INFORMATION (FIFTH INFORMATION) | FIRST INFORMATION | SECOND INFORMATION |
|---|---|---|
| – | 301 (CLOUD SERVICE) | 1101 |
| 1101 | 444 (CLOUD PRINTING) | 2200 |
| 1101 | 445 (CLOUD SCANNING) | 3100 |

INFORMATION PROCESSING SYSTEM, INFORMATION PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2013-021830 filed in Japan on Feb. 6, 2013 and Japanese Patent Application No. 2013-245403 filed in Japan on Nov. 27, 2013.

BACKGROUND OF THE INVENTION

1. Field of the Invention

The present invention relates to an information processing system, an information processing method, and a computer program product.

2. Description of the Related Art

Conventionally, there has been a technique for controlling provision of services to users by using ID information (such as the telephone numbers used in phone services, and the serial numbers of the devices used for providing specific services) to be used for identifying users to whom services are to be provided.

However, the ID information is shared among different kinds of services in some cases, and the conventional technique is unable to guarantee sufficient uniqueness of information that indicates an authority to use a service.

Therefore, there is a need for an information processing system and an information processing method that are capable of guaranteeing uniqueness of information that indicates an authority to use a service.

SUMMARY OF THE INVENTION

According to an embodiment, an information processing system includes a receiving unit and a determining unit. The receiving unit receives an application request to request an application for a service. The application request includes first information identifying a type of the service. When the receiving unit receives the application request, the determining unit determines third information indicating an authority to use the service by combining the first information included in the application request and second information used for identifying a user to whom the service is to be provided.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram showing an example of a functional structure of the ID information managing unit;

FIG. 4 is a diagram showing an example of a data structure in the storage unit of a first embodiment;

FIG. 5 is a flowchart showing an example process to determine third information;

FIG. 6 is a diagram showing an example of a data structure in a storage unit of a second embodiment;

FIG. 7 is a diagram showing an example of a data structure in a storage unit of a third embodiment;

FIG. 8 is a diagram showing an example data structure in a storage unit in a case where the second embodiment and the third embodiment are combined; and FIG. 9 is a conceptual diagram of a modification.

DETAILED DESCRIPTION OF THE PREFERRED EMBODIMENTS

Embodiments according to the present invention will be described below in detail with reference to the accompanying drawings.

First Embodiment

Figure 1:
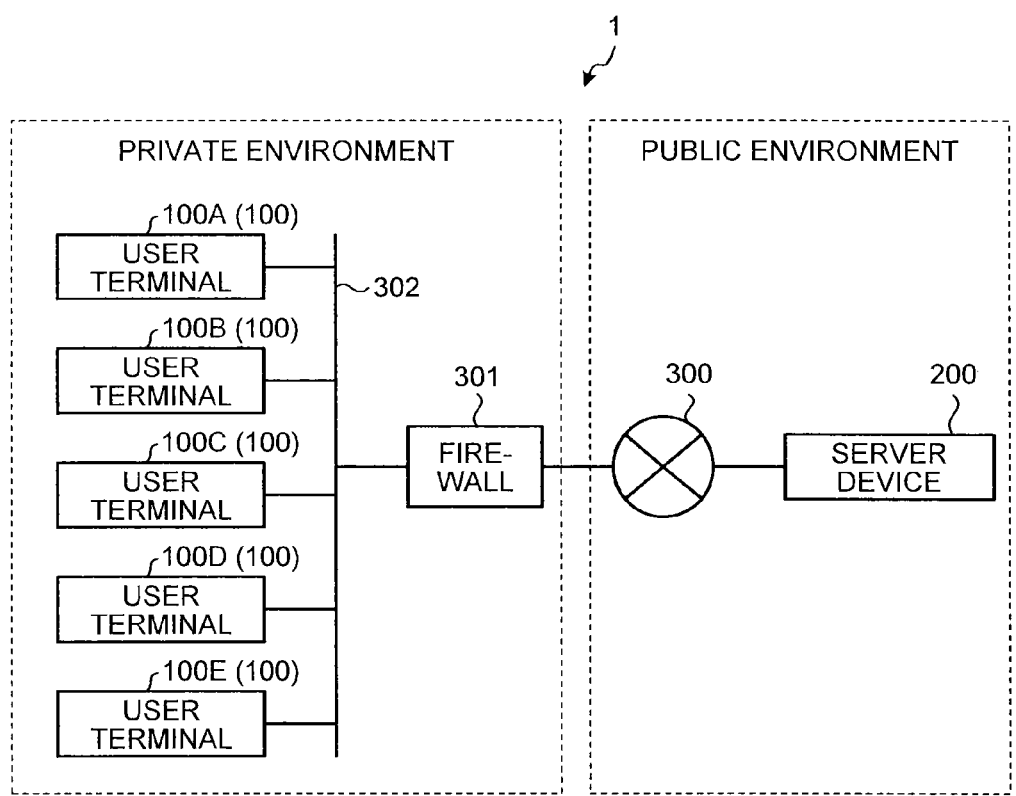
FIG. 1 is a diagram schematically showing an example of a structure of an information processing system of a first embodiment.

FIG. 1 is a block diagram showing an example of a structure of an information processing system 1 of the first embodiment. As shown in FIG. 1, the information processing system 1 includes user terminals 100 and a server device 200 capable of providing various kinds of services. Each user terminal 100 and the server device 200 can be connected to each other via a network 300 in a public environment such as the Internet. More specifically, user terminals 100A to 100E are connected to a network 302 in a private environment such as a LAN (Local Area Network) or an intranet, and the server device 200 is connected to the network 300 in a public environment such as the Internet.

For example, the network 302 in the private environment corresponding to a intra-firm network of a customer is connected to the network 300 in the public environment via a firewall 301, so that the user terminals 100A to 100E and the server device 200 can be connected to each other. A cloud environment is one example of the public environment. In the following description, the user terminals 100A to 100E are simply referred to as the "user terminals 100" as long as there is no need to distinguish the user terminals 100A to 100E from one another. Examples of the user terminals 100 include PCs, mobile terminals, image forming apparatuses, TV conference systems, projectors, and IC recorders. As the user terminal 100 transmits a service execution request to the server device 200, a service providing unit 240 to be described later in the server device 200 can perform predetermined processing in cooperation with at least one user terminal 100 as needed, to provide a service to the user terminal 100.

Meanwhile, there is a case in which the server device 200 also transmits a request to the user terminal 100 depending on the type of the service to be provided. However, in a case where the network 302 is connected to the network 300 via the firewall 301 as in the information processing system 1 shown in FIG. 1, the server device 200 is unable to transmit the request to the user terminal 100.

In view of the above, when the network 302 is connected to the network 300 via the firewall 301, the user terminal 100 connected to the network 302 may poll the server device 200 so that the user terminals 100 can receive requests from the server device 200. Furthermore, in a case where the network 302 is connected to the network 300 via the firewall 301, the user terminal 100 connected to the network 302 may establish communicate with the server device 200 by using XMPP (Extensible Messaging and Presence Protocol). The XMPP involves a technique called BOSH (Bidirectionalstreams Over Synchronous HTTP) for transmitting and receiving messages in HTTP. By using BOSH, the server device 200 may implement a push function that is not provided in general (not a function of the user terminal 100 to receive the request but a function of the server device 200 to asynchronously transmit the request to an electronic device).

Figure 2:
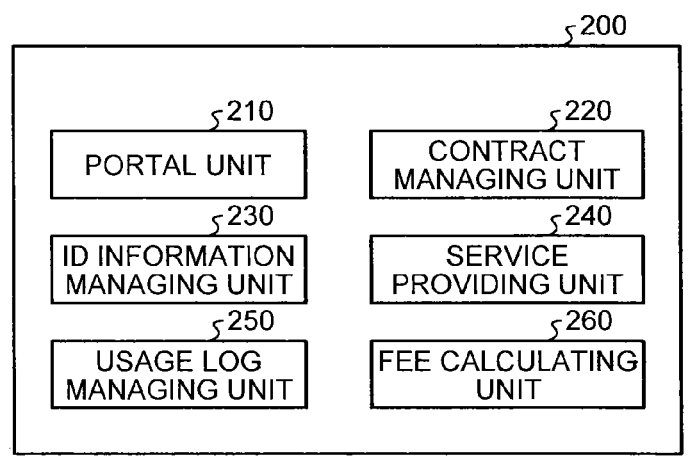
FIG. 2 is a diagram showing an example of a functional structure of the server device.

FIG. 2 is a block diagram showing an example of a functional structure of the server device 200. As shown in FIG. 2, the server device 200 includes a portal unit 210, a contract managing unit 220, an ID information managing unit 230, a service providing unit 240, a usage log managing unit 250, and a fee calculating unit 260.

The portal unit 210 serves as a portal (window) for providing services to each of the user terminals 100. In this example, when receiving an application request to request an application for a service from a user terminal 100, the portal unit 210 transmits the received application request to the contract managing unit 220. When receiving a service request to request a service from a user terminal 100, the portal unit 210 transmits the received service request to the ID information managing unit 230.

Upon receipt of the application request from the portal unit 210, the contract managing unit 220 transmits the received application request to the ID information managing unit 230. The contract managing unit 220 then receives third information (described later) indicating an authority to use the service determined by the ID information managing unit 230, as a reply to the application request. The third information is determined by the ID information managing unit 230. The contract managing unit 220 registers and manages each piece of the third information so as to be associated with contract information indicating the contents of the service to be provided, the contract period, the unit time equivalent to each of the intervals at which a fee is charged, and the like.

In response to the application request from the contract managing unit 220, the ID information managing unit 230 determines the third information indicating the authority to use the service. Although the ID information managing unit 230 has a function of authenticating the user terminal 100 requesting the service in this example, this embodiment is not limited thereto. For example, the authentication function may be provided in a functional module different from the ID information managing unit 230. The specifics of the ID information managing unit 230 are described below.

FIG. 3 is a diagram showing a specific example of a configuration of the ID information managing unit 230. As shown in FIG. 3, the ID information managing unit 230 includes a receiving unit 231, a determining unit 232, a storage unit 233, a notifying unit 234, and an authenticating unit 235.

The receiving unit 231 receives the application request from the contract managing unit 220. Here, the application request includes first information identifying the type of the service. The first information can be regarded as information indicating a contract classification category. For example, in a case where a user requests an application for receiving a TV conference service using a special-purpose terminal (hereinafter also referred to as a "special-device TV conference service" in some cases), application information includes the first information indicating that the type of the service is a "special-device TV conference service". That is, the first information is information with which the type of the service can be identified, and may be a license contract number with which the type of the service can be uniquely identified, for example. Although the receiving unit 231 in this example can be considered equivalent to the "receiving unit" of the claims, the "receiving unit" of the claims is not limited thereto. For example, a function of the portal unit 210 may be considered equivalent to the "receiving unit" of the claims.

When the receiving unit 231 receives the application request, the determining unit 232 combines the first information included in the application request and second information to be used for identifying the user to whom the service is to be provided. By doing so, the determining unit 232 determines the third information indicating the authority to use the service. The second information may be the telephone number being used in the phone service, the information (such as the serial number) identifying the device to be used for providing a specific service to the user (such as a TV conference terminal to be used for providing the TV conference service to the user), or the like, but is not limited thereto. That is, the second information is the information to be used for identifying the user to whom the service is to be provided.

In this embodiment, the above described second information is determined by the determining unit 232. More specifically, the application information in this embodiment includes the first information and fourth information corresponding to the second information. For example, when the second information is a telephone number, the fourth information is an e-mail address corresponding to the telephone number. The ID information managing unit 230 includes a storage device (such as the storage unit 233) that stores therein correspondence relationship information indicating the correspondence relationship between the second information and the fourth information. When the receiving unit 231 receives the application request, the determining unit 232 refers to the correspondence relationship information, to determine the second information corresponding to the fourth information included in the received application information. The determining unit 232 determines, as the third information, the combination of the second information determined in the above manner and the first information included in the application request.

Alternatively, the fourth information may be the second information. In this case, the correspondence relationship information is unnecessary. In other words, the application information may include the second information.

The determining unit 232 registers the determined third information in the storage unit 233. FIG. 4 is a diagram showing an example of a data structure in the storage unit 233. In the example shown in FIG. 4, there are six pieces of the third information. For example, the third information in the first row is formed with a combination of the first information indicating that the type of the service is a "special-device TV conference service" and the second information indicating the serial number ("0001-C2" in the example in FIG. 4) identifying the TV conference terminal.

Referring back to FIG. 3, the notifying unit 234 notifies the contract managing unit 220 of the third information determined by the determining unit 232.

In this embodiment, the ID information managing unit 230 also has a function of authenticating the user terminal 100 requesting the service. Details are as follows. The receiving unit 231 also has a function of receiving the service request from the portal unit 210. In this case, the service request includes the first information and the fourth information corresponding to the second information.

When the receiving unit 231 receives the service request, the authenticating unit 235 determines whether the third information corresponding to the service request is included in the one or more pieces of third information stored in the storage unit 233. As described above, in this embodiment, the correspondence relationship information indicating the correspondence relationship between the second information and the fourth information is stored in the storage unit 233 or the like. When the receiving unit 231 receives the service request, the authenticating unit 235 refers to the correspondence relationship information, to identify the second information corresponding to the fourth information included in the service request. However, this embodiment is not limited thereto, and the fourth information may be the second information (or the service request may include the second information), for example.

The authenticating unit 235 then determines whether the third information indicating the combination of the identified second information and the first information included in the service request is included in the one or more pieces of third information stored in the storage unit 233. If the third information corresponding to the service request is included in the one or more pieces of third information stored in the storage unit 233, the authenticating unit 235 authenticates the user terminal 100 that has transmitted the service request (i.e., the authenticating unit 235 allows provision of the requested service). The authenticating unit 235 can also perform authentication using a password or the like, if necessary.

In a case where the authenticating unit 235 determines that the third information corresponding to the service request is included in the one or more pieces of third information stored in the storage unit 233 (i.e., in a case where the user terminal 100 that has transmitted the service request is authenticated), the notifying unit 234 notifies the service providing unit 240 of the service execution request to request execution of the service corresponding to the third information. In this embodiment, when the authenticating unit 235 determines that the third information corresponding to the service request is included in the one or more pieces of third information stored in the storage unit 233, the notifying unit 234 notifies the service providing unit 240 of the service execution request to request execution of the service corresponding to the third information (i.e., the service that is allowed to be used depending on the third information corresponding to the service request). Although the service execution request includes the third information corresponding to the service request in this example, the embodiment is not limited thereto. The details of the ID information managing unit 230 are as described above.

Referring back to FIG. 2, the service providing unit 240 has a function of performing (providing) a service in accordance with the service execution request from the ID information managing unit 230. The service providing unit 240 then outputs, at predetermined intervals, usage log information in which the third information is associated with a usage log indicating a usage status of the service (information indicating the period of time of connection with the other end of a TV conference in the case of a special-device TV conference service, for example), to the usage log managing unit 250.

Although the service execution request includes the third information corresponding to the service request, the embodiment is not limited thereto. For example, the service execution request may be the service request. In such a case, the service providing unit 240 refers to the above described correspondence relationship information, to identify the second information corresponding to the fourth information included in the service request (the service execution request) from the ID information managing unit 230. After identifying the third information indicating the combination of the identified second information and the first information included in the service request, the service providing unit 240 can perform the service corresponding to the third information.

The usage log managing unit 250 manages, in chronological order, the usage log information that is sequentially output from the service providing unit 240. The fee calculating unit 260 has a function of acquiring the usage log corresponding to each piece of the third information (the usage log corresponding to the period of time (the unit time period specified in the terms and conditions of the contract, for example) for which a fee is to be charged) from the usage log managing unit 250 in accordance with a request from the contract managing unit 220, and calculate the fee for the provided service based on the acquired usage log.

In this embodiment, the hardware configuration of a computer device including a CPU, a ROM, a RAM, and the like is used as the hardware configuration of the server device 200. The functions of the respective units (the portal unit 210, the contract managing unit 220, the ID information managing unit (the receiving unit 231, the determining unit 232, the notifying unit 234, and the authenticating unit 235), the service providing unit 240, the usage log managing unit 250, and the fee calculating unit 260) of the above described server device 200 are implemented by the CPU reading and loading a program stored in the ROM or the like on the RAM to execute the program. However, the configuration is not limited thereto, and at least a part of the functions of the respective units of the server device 200 may be implemented by a special hardware circuit. The storage unit 233 can be implemented by an auxiliary storage device such as the ROM, the RAM, and an HDD.

FIG. 5 is a flowchart showing an example of the process to be performed by the ID information managing unit 230 of this embodiment to determine the third information. As shown in FIG. 5, the receiving unit 231 first receives an application request from the contract managing unit 220 (step S1). The determining unit 232 refers to the correspondence relationship information stored in the storage unit 233 or the like, and determines the second information corresponding to the fourth information included in the application request received in step S1 (step S2). The determining unit 232 determines, as the third information indicating an authority to use the service, the combination of the second information determined in step S2 and the first information included in the application request received in step S1 (step S3). The determining unit 232 then registers the third information determined in step S3 in the storage unit 233 (step S4).

As described above, in the first embodiment, the combination of the first information identifying the type of service and the second information to be used for identifying the user to whom the service is to be provided is determined as the third information indicating an authority to use the service. Accordingly, an advantageous effect to guarantee sufficient uniqueness of the information indicating the authority to use the service can be achieved.

Second Embodiment

Next, a second embodiment is described. The second embodiment differs from the first embodiment in that, when a group registration request to request registration of a group indicating a predetermined unit (a unit to which a specific service is to be provided, for example) is received, fifth information (the group ID) identifying the group for which registration is requested is associated with respective pieces of third information constituting the group for which registration is requested, and the fifth information and the third information are registered and managed. Detailed description is given below. However, explanation of the same contents as those of the first embodiment is not repeated herein.

As the server device 200 basically has the same configuration as the server device 200 of the first embodiment, the following description is based on the configurations shown in FIGS. 2 and 3. In this embodiment, the portal unit 210 has a function of receiving group registration requests from the user terminals 100, as well as the functions described above in the first embodiment. When receiving a group registration request from a user terminal 100, the portal unit 210 transmits the received group registration request to the contract managing unit 220.

Upon receipt of the group registration request from the portal unit 210, the contract managing unit 220 transmits the received group registration request to the ID information managing unit 230. As a reply, the contract managing unit 220 receives information in which the fifth information identifying the group is associated with each of the pieces of the third information constituting the group. The contract managing unit 220 associates contract information with each combination of one piece of the fifth information and one piece of the third information, and registers and manages the information in a database unit (not shown). In this example, the contract information includes information indicating the contents of the specific service (such as a special discount service like a family discount) to be provided to the group identified by the fifth information, for example, as well as the contents described in the first embodiment.

In response to the group registration request from the contract managing unit 220, the ID information managing unit 230 associates the fifth information identifying the group for which registration is requested with the respective pieces of the third information constituting the group for which registration is requested, and then registers them. More detailed description is given below.

The receiving unit 231 receives the group registration request from the contract managing unit 220. Here, the group registration request includes combination information indicating combinations of respective pieces of fourth information having one-to-one correspondence with pieces of the second information and the first information. As in the first embodiment, the ID information managing unit 230 includes a storage device (such as the storage unit 233) that stores therein correspondence relationship information indicating the correspondence relationship between the second information and the fourth information.

When the receiving unit 231 receives the group registration request, the determining unit 232 determines the fifth information identifying the group formed with the pieces of the third information corresponding to the combination information included in the received group registration request. More specifically, the determining unit 232 refers to the correspondence relationship information, to identify the second information corresponding to each piece of the fourth information included in the combination information, and identify the third information indicating the combinations of the identified second information and the first information included in the combination information. In this manner, the determining unit 232 identifies the same number of pieces of the third information as the number of the pieces of the fourth information included in the combination information, and determines the fifth information identifying the group (i.e., the group for which registration is requested) formed with the identified pieces of the third information. The determining unit 232 then registers, in the storage unit 233, the determined fifth information so as to be associated with the respective pieces of the third information identified from the combination information.

Alternatively, the fourth information may be the second information. In this case, the above described correspondence relationship information is unnecessary.

FIG. 6 is a diagram showing an example of a data structure in the storage unit 233. In the example shown in FIG. 6, the respective pieces of the third information in the first through fifth rows are associated with the same fifth information (the information indicating "AA Industry"). That is, the pieces of the third information in the first to fifth rows constitute the group identified by "AA Industry".

The notifying unit 234 notifies the contract managing unit 220 and the fee calculating unit 260 of the information in which the fifth information determined by the determining unit 232 is associated with the respective pieces of the third information corresponding to the combination information included in the group registration request. The fee calculating unit 260 acquires the usage logs corresponding to the respective pieces of the third information from the usage log managing unit 250, in accordance with a request from the contract managing unit 220. The fee calculating unit 260 also acquires the contract information (such as the information indicating the contents of the specific service (such as a special discount service like a family discount) to be provided for each piece of the fifth information) from the contract managing unit 220. For each piece of the third information, the fee calculating unit 260 calculates the fee for the provided service based on the usage log acquired from the usage log managing unit 250 and the contract information acquired from the contract managing unit 220.

As described above, according to the second embodiment, the pieces of the third information included in the same group can be collectively managed.

Third Embodiment

Next, a third embodiment is described. The third embodiment differs from the first and second embodiments in that the third information indicating an authority to use a service may be formed with a combination of the first information, the second information, and sixth information identifying a lower-level service designated by the user among the lower-level services (including optional services in "communication services" such as a phone service and an e-mail service) included in the type of service identified by the first information. Detailed description is given below. However, explanation of the same contents as those of the above described embodiments is not repeated herein.

As the server device 200 basically has the same configuration as the server device 200 of the above described first embodiment, the following description is based on the configurations shown in FIGS. 2 and 3. In this embodiment, the application request may include the sixth information. Since the operation to be performed in a case where the application request does not include the sixth information is the same as the operation in the above described first embodiment, the following description concerns an example case where the application request includes the sixth information.

As in the first embodiment, when receiving the application request from a user terminal 100, the portal unit 210 transmits the received application request to the contract managing unit 220. Upon receipt of the application request from the portal unit 210, the contract managing unit 220 transmits the received application request to the ID information managing unit 230.

As in the first embodiment, the ID information managing unit 230 determines the third information indicating an authority to use the service in accordance with the application request from the contract managing unit 220. More specifically, when the receiving unit 231 receives the application request, the determining unit 232 determines third information indicating the authority to use the service, by combining the second information to be used for identifying the user to whom the service is to be provided, and the first and sixth information included in the application request. Here, the second information is determined by the determining unit 232, as in the above described first embodiment. More specifically, the application information includes the first information, the fourth information corresponding to the second information, and the sixth information. The ID information managing unit 230 includes a storage device (such as the storage unit 233) that stores therein correspondence relationship information indicating the correspondence relationship between the second information and the fourth information. When the receiving unit 231 receives the application request, the determining unit 232 refers to the correspondence relationship information, to determine the second information corresponding to the fourth information included in the received application information. The determining unit 232 determines as the third information, the combination of the second information determined in the above manner and the first and sixth information included in the application request. Alternatively, the fourth information may be the second information. In this case, the above described correspondence relationship information is unnecessary. That is, the application information may include the second information instead of the fourth information.

The determining unit 232 registers the determined third information in the storage unit 233, as in the above described first embodiment. FIG. 7 is a diagram showing an example of a data structure in the storage unit 233. In the example shown in FIG. 7, there are six pieces of the third information. For example, the third information in the first row is formed with the combination of the first information indicating that the type of the service is a special-device TV conference service, the second information indicating the serial number ("0001-C2" in the example shown in FIG. 7) identifying the TV conference terminal, and the sixth information indicating the sub ID ("01" in the example shown in FIG. 7) identifying the designated lower-level service as a "corporate TV conference service", which is an in-house TV conference service using a special-purpose terminal. The third information in the fifth row represents an example case where the application request does not include the sixth information, and is formed with the combination of the first information indicating that the type of the service is an equipment rental service, and the second information indicating the serial number ("0001-C2" in the example shown in FIG. 7) identifying the rental equipment.

The notifying unit 234 notifies the contract managing unit 220 of the third information determined by the determining unit 232, as in the above described first embodiment.

In this embodiment, the ID information managing unit 230 also has a function of authenticating the user terminal 100 requesting the service. Details description is given below. The following description concerns an example case where the service request received by the receiving unit 231 from the portal unit 210 includes the sixth information. The operation to be performed when the service request does not include the sixth information is the same as the operation in the above described first embodiment.

When the receiving unit 231 receives the service request, the authenticating unit 235 determines whether the third information corresponding to the service request is included in the one or more pieces of the third information stored in the storage unit 233. In this embodiment, the correspondence relationship information indicating the correspondence relationship between the second information and the fourth information is stored in the storage unit 233 or the like, as in the above described first embodiment. When the receiving unit 231 receives the service request, the authenticating unit 235 refers to the correspondence relationship information, to identify the second information corresponding to the fourth information included in the service request. However, the embodiment is not limited thereto, and the fourth information may be the second information, for example. In this case, the correspondence relationship information is unnecessary. That is, the service request may include the second information instead of the fourth information.

When the authenticating unit 235 determines that the third information corresponding to the service request is included in the one or more pieces of the third information stored in the storage unit 233, the notifying unit 234 notifies the service providing unit 240 of the service execution request to request execution of the service corresponding to the third information. The respective functions of the service providing unit 240, the usage log managing unit 250, and the fee calculating unit 260 are the same as those of the above described first embodiment.

The third embodiment can be combined with the above described second embodiment. For example, when the group formed with the pieces of the third information in the first through fifth rows in FIG. 7 is registered, the storage unit 233 has the data structure shown in FIG. 8. As shown in FIG. 8, the respective pieces of the third information in the first to fifth rows are associated with the same fifth information (the information indicating "AA Industry").

Modifications

One piece of the third information may also indicate an authority to use a lower-level service included in the type of service identified by the first information included in the piece of the third information, for example. FIG. 9 is a conceptual diagram illustrating such an example. In the example shown in FIG. 9, the higher-level service is a cloud service, and the cloud service includes cloud printing and cloud scanning as lower-level services. In the example shown in FIG. 9, the second information ("1101") included in the third information (the information indicating an authority to use the cloud service) formed with the combination of the first information indicating the cloud service as the type of the higher-level service and the second information indicating that the information to be used for identifying the user to whom the service is to be provided is "1101" is used as the group ID information for binding the lower-level services (the group ID information can be regarded as information to be handled like the above described fifth information). Detailed description is given below.

As for cloud printing, for example, the second information ("1101" in the example shown in FIG. 9) included in the third information corresponding to the higher-level cloud service, the first information indicating that the type of the service is cloud printing, and the second information indicating that the information to be used for identifying the user is "2200" are associated with one another. As for cloud scanning, for example, the second information ("1101" in the example shown in FIG. 9) included in the third information corresponding to the higher-level cloud service, the first information indicating that the type of the service is cloud scanning, and the second information indicating that the information to be used for identifying the user is "3100" are associated with one another.

In this embodiment, it is possible to use all the lower-level services (cloud printing and cloud scanning) by making access with the third information corresponding to the higher-level cloud service, for example. Also, to increase security, an ID or a password may be required for using a lower-level service.

Depending on the type of lower-level service, a check may be made to determine whether the user has the authority to use the lower-level service (the third information corresponding to the lower-level service may be authenticated independently).

The functions of the respective components of the above described server device 200 may be separately mounted on one or more other devices. In other words, an information processing system according to the present invention will suffice as long as it includes a receiving unit and a determining unit. The receiving unit receives an application request that includes the first information identifying the type of service and that requests an application for the service. When the receiving unit receives the application request, the determining unit determines the third information indicating the authority to use the service, by combining the second information to be used for identifying the user to whom the service is to be provided and the first information included in the application request.

It should be noted that each of the above described embodiments and each modification can be arbitrarily combined.

The various programs to be executed by the above described server device 200 may be provided in a installable or executable file recorded in a computer-readable recording medium such as a CD-ROM, a flexible disk (FD), a CD-R, a DVD (Digital Versatile Disk), or a USB (Universal Serial Bus), or may be provided or distributed over a network such as the Internet. The various programs may be incorporated beforehand into a ROM or the like, and be then provided.

According to the present invention, sufficient uniqueness of the information that indicates an authority to use a service can be guaranteed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing system comprising:
   circuitry; and
   a memory configured to store therein
      service identification information identifying a type of a service so as to be associated with first-type user identification information used for identifying a user to whom the service is to be provided,
      a plurality of second-type user identification information so as to be separately associated with the first-type user identification information, the second-type user identification information being different from the first-type user identification information and being used for identifying the user, the plurality of second-type user identification information including a telephone number used when the type of service is a phone service and a serial number of a device used in a video conference when the type of service is a videoconference, wherein
   the circuitry is configured to
      receive a service execution request, from a user terminal device that is connected to the information processing system via a network and from behind a firewall, to request execution for a service, the service execution request including the second-type user identification information which varies based on the type of service;
      determine whether the first-type user identification information that is stored so as to be associated with the second-type identification information included in the service execution request is associated with the service identification information identifying a type of the service for which execution is requested by the service execution request; and
      provide the service for which execution is requested by the service execution request when the determination is affirmative.

2. The information processing system of claim 1, wherein the circuitry is configured to
   receive, from the user terminal device, an application request including service identification information identifying a type of a service to request an application for the service, and
   store, in the memory, service identification information identifying the type of the service included in the application request so as to be associated with first-type user identification information used for identifying the user.

3. The information processing system of claim 1, wherein, the circuitry is configured to
   receive a group registration request to request registration of a group, the group registration request including combination information indicating combinations of pieces of user identification information used for identifying mutually different users, pieces of second-type user identification information used for identifying the users identified by the first-type user identification information, and pieces of the service identification information, and
   store in the memory the service identification information included in the received group registration request so as to be associated with group identification information identifying the group for which registration is requested.

4. The information processing system of claim 2, wherein
   the application request further includes lower-level service identification information identifying a lower-level service designated by the user among a plurality of lower-level services included in the service of the type identified by the service identification information, and
   the circuitry is configured to store in the memory the first-type user identification information identifying the user so as to be associated with the service identification information and the lower-level service identification information included in the application request when receiving the application request.

5. The information processing system of claim 4, wherein the service request includes the lower-level service identification information.

6. An information processing method, implemented by an information processing system having circuitry and a memory configured to store therein service identification information identifying a type of a service so as to be associated with first-type user identification information used for identifying a user to whom the service is to be provided, a plurality of second-type user identification information so as to be associated with the first-type user identification information, the second-type user identification information being different from the first-type user identification information and being used for identifying the user, the plurality of second-type user identification information including a telephone number used when the type of service is a phone service and a serial number of a device used in a video conference when the type of service is a videoconference, comprising:

receiving, by the circuitry, a service execution request, from a user terminal device that is connected to the information processing system via a network and from behind a firewall, to request execution for a service, the service execution request including the second-type user identification information which varies based on the type of service;

determining, by the circuitry, whether the first-type user identification information that is stored so as to be associated with the second-type identification information included in the service execution request is associated with the service identification information identifying a type of the service for which execution is requested by the service execution request; and providing, by the circuitry, the service for which execution is requested by the service execution request when the determination is affirmative.

7. A non-transitory computer-readable medium containing a computer program, the program causing an information processing system, having circuitry and a memory configured to store therein service identification information identifying a type of a service so as to be associated with first-type user identification information used for identifying a user to whom the service is to be provided, a plurality of second-type user identification information so as to be associated with the first-type user identification information, the second-type user identification information being different from the first-type user identification information and being used for identifying the user, the plurality of second-type user identification information including a telephone number used when the type of service is a phone service and a serial number of a device used in a video conference when the type of service is a videoconference, to perform:

receiving, by the circuitry, a service exec ion request, from a user terminal device that is connected to the information processing system via a network and from behind a firewall, to request execution for a service, the service execution request including the second-type user identification information which varies based on the type of service;

determining, by the circuitry, whether the first-type user identification information that is stored so as to be associated with the second-type identification information included in the service execution request is associated with the service identification information identifying a type of the service for which execution is requested by the service execution request; and providing, by the circuitry, the service for which execution is requested by the service execution request when the determination is affirmative.

8. The information processing system of claim 1, wherein, the circuitry is configured to store in the memory a usage log of the service when providing the service, and calculate, for each service identification information corresponding to the first-type user identification information, a fee for the provided service based on the stored usage log.

9. The information processing system of claim 1, the second-type user identification information being information used in execution of the service to be provided without directly identifying the user.

* * * * *